(12) United States Patent
Louvel

(10) Patent No.: US 9,391,529 B2
(45) Date of Patent: Jul. 12, 2016

(54) POWER CONVERTER INCLUDING A SECONDARY SYNCHRONOUS RECTIFICATION CONTROL MODULE

(71) Applicant: Semiconductor Components Industries, LLC, Phoenix, AZ (US)

(72) Inventor: Jean-Paul Louvel, Colomiers (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 617 days.

(21) Appl. No.: 13/783,868

(22) Filed: Mar. 4, 2013

(65) Prior Publication Data

US 2014/0247627 A1    Sep. 4, 2014

(51) Int. Cl.
*H02M 3/335*    (2006.01)

(52) U.S. Cl.
CPC ........ *H02M 3/33592* (2013.01); *Y02B 70/1433* (2013.01); *Y02B 70/1475* (2013.01)

(58) Field of Classification Search
CPC ............ H02M 3/335; H02M 3/33507; H02M 3/33523; H02M 3/33576; H02M 3/33592; H02M 2001/0064; H02M 3/33546; Y02B 70/1433; Y02B 70/1475
USPC ....................... 363/21.06, 21.14, 21.01–21.18
See application file for complete search history.

(56) References Cited

U.S. PATENT DOCUMENTS

| | | | | |
|---|---|---|---|---|
| 5,498,995 A * | 3/1996 | Szepesi | ............. | H02M 3/33507 327/101 |
| 5,745,358 A * | 4/1998 | Faulk | ................ | H02M 3/33523 363/21.13 |
| 5,991,171 A * | 11/1999 | Cheng | ................ | H02M 3/33507 363/21.03 |
| 6,594,161 B2 * | 7/2003 | Jansen | ............... | H02M 3/33592 363/21.13 |
| 6,961,253 B1 | 11/2005 | Cohen | | |
| 2007/0121351 A1 | 5/2007 | Zhang et al. | | |
| 2007/0153554 A1 * | 7/2007 | Matsumoto | ....... | H02M 3/33592 363/16 |
| 2007/0242486 A1 | 10/2007 | Moromizato | | |
| 2008/0002441 A1 * | 1/2008 | Allinder | ............ | H02M 3/33592 363/21.14 |
| 2008/0043497 A1 | 2/2008 | Pwu et al. | | |
| 2008/0049455 A1 | 2/2008 | Moromizato | | |
| 2009/0213623 A1 * | 8/2009 | Yang | .................. | H02M 3/33507 363/49 |
| 2010/0027298 A1 * | 2/2010 | Cohen | ............... | H02M 3/33592 363/21.14 |
| 2010/0097104 A1 | 4/2010 | Yang et al. | | |
| 2010/0182806 A1 * | 7/2010 | Garrity | ............. | H02M 3/33569 363/21.14 |
| 2010/0219802 A1 | 9/2010 | Lin et al. | | |
| 2011/0216559 A1 | 9/2011 | Ng et al. | | |
| 2011/0222318 A1 | 9/2011 | Uno et al. | | |
| 2011/0305043 A1 * | 12/2011 | Matsumoto | ....... | H02M 3/33592 363/21.01 |
| 2012/0081927 A1 * | 4/2012 | Matsumoto | ....... | H02M 3/33523 363/21.05 |
| 2012/0257421 A1 * | 10/2012 | Brkovic | .................. | H01F 27/38 363/21.07 |

OTHER PUBLICATIONS

Jean-Paul Louvel, Continuous Conduction Mode for High Peak Power Quasi Resonance Flyback Power Converter, Nov. 2011.

* cited by examiner

*Primary Examiner* — Timothy J Dole
*Assistant Examiner* — Ivan Laboy Andino
(74) *Attorney, Agent, or Firm* — Rennie William Dover

(57) ABSTRACT

In accordance with an embodiment, a method for controlling a circuit includes controlling pulse width modulation on a primary side of a quasi-resonant controller to achieve continuous current mode operation from a synchronous rectification controller on a secondary side.

11 Claims, 7 Drawing Sheets

POWER CONVERTER INCLUDING A SECONDARY SYNCHRONOUS RECTIFICATION CONTROL MODULE

BACKGROUND

The present invention relates, in general, to electronics and, more particularly, to methods of forming semiconductor devices and structure.

In the past, various circuits and methods were used to control synchronous rectifiers in power supply systems. Usually, the control methods depended on the operating mode and the type of power supply system. Flyback type power supply systems usually required complex control circuits. In a flyback converter, the current through a primary coil of a transformer was terminated in order to cause the magnetic field to collapse and couple power to a secondary inductor of the transformer. In the flyback converter, the synchronous rectifier typically was in the secondary side of the power supply system and the switching power supply controller was in the primary side of the power supply system. One method of operating a flyback converter system utilized a fixed frequency clock to predict the time in which the synchronous rectifier should be enabled or disabled. An example of such a flyback system was disclosed in U.S. Pat. No. 6,418,039 issued to Franco Lentini et al. on Jul. 9, 2002. Complicated circuitry was required to implement the control, which increased the system cost. Additionally, some flyback systems also included burst-mode operation to reduce power dissipation during light load conditions. It was difficult to accurately predict the proper time to enable and disable the synchronous rectifier, thus, the operation was inefficient.

Accordingly, it would be advantageous to have a control method and circuit that accurately controls a secondary side synchronous rectifier that does not include complicated circuitry. It is desirable for the circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
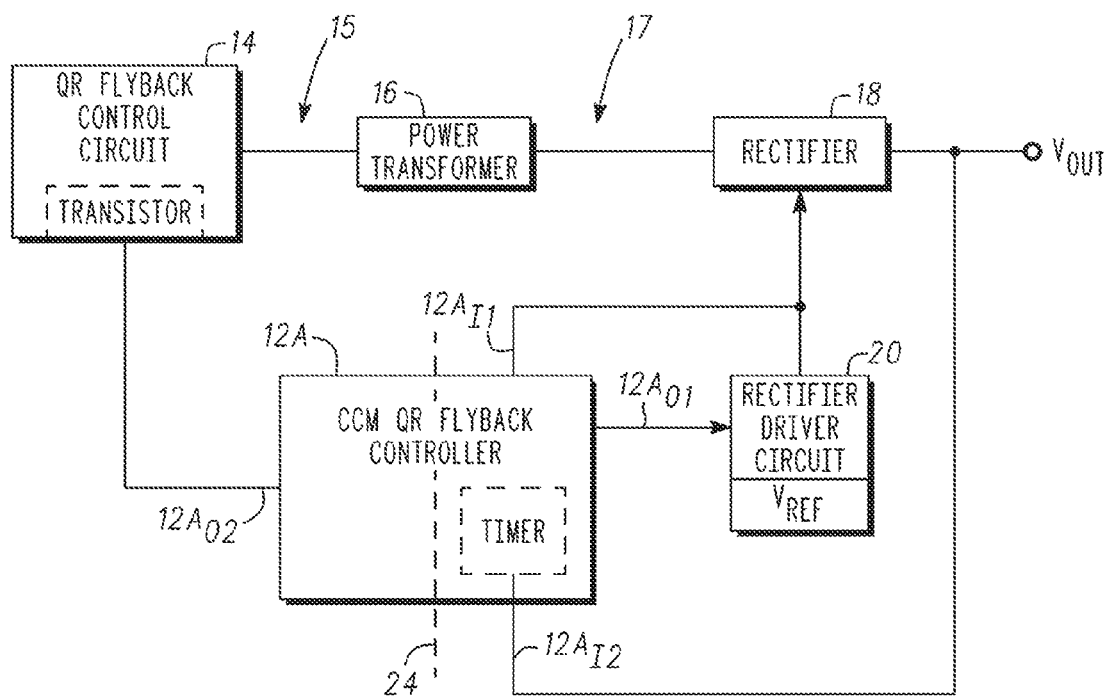
FIG. 1 is a block diagram of a power converter including a secondary synchronous rectification control module in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

FIG. 1 is a block diagram of a power converter 10A including a secondary synchronous rectification control module 12A in accordance with an embodiment of the present invention. What is shown in FIG. 1 is a power transformer 16 having an input coupled for receiving a control signal from a flyback control circuit 14 and an output coupled to a rectifier 18. Control circuit 14 may be referred to as a primary side control circuit. In addition, a rectifier driver circuit 20 is connected to rectifier 18. It should be noted that flyback control circuit 14 may be referred to as a control circuit or a quasi-resonant (QR) flyback control circuit, rectifier driver circuit 20 may be referred to as a driver circuit, and secondary synchronous rectification control module 12A may be referred to as a synchronous rectification control module, a continuous current mode (CCM) quasi-resonant (QR) flyback controller, a control module, or a control circuit. It should be further noted that the input side 15 of power transformer 16 is referred to as its primary side and the output side 17 of power transformer 16 is referred to as its secondary side and that rectifier driver circuit 20 includes a reference voltage circuit for generating a reference voltage $V_{REF}$ or for receiving reference voltage $V_{REF}$.

Synchronous rectification control module 12A is connected between flyback control circuit 14 and rectifier driver circuit 20. Control module 12A comprises a portion that is associated with primary side 15 of power transformer 16 and a portion that is associated with the secondary side 17 of power transformer 16 as indicated by a broken line 24. The portion of control module 12A associated with secondary side 17 of power transformer 16 includes a timer or timer circuit 11. A drive signal from rectifier driver circuit 20 is connected to an input $12A_{I1}$ so that control module 12A can monitor the drive signal. Output signal $V_{OUT}$ is connected to an input $12A_{I2}$ of control module 12A and is configured for starting a timer that limits the length or duration of time over which secondary synchronous rectification occurs. The time during which secondary synchronous rectification occurs may be referred to as the on-time for secondary synchronous rectification, the secondary synchronous rectification on-time, the secondary synchronous rectification time, or the like. The secondary synchronous rectification on-time is determined by comparing the voltage, and therefore the charge, of a capacitor to a reference voltage $V_{REF}$, wherein inputs $12A_{I1}$ and $12A_{I2}$ are associated with secondary side 17 of power transformer 16. As discussed above, reference voltage $V_{REF}$ is generated by rectifier driver circuit 20. An output $12A_{O1}$ of control module 12A that is associated with secondary side 17 of power transformer 16 is connected to an input of driver circuit 20 to trigger a clock signal.

The portion of control module 12A associated with primary side 15 of power transformer 16 generates a control signal at output terminal $12A_{O2}$ that is transmitted to flyback control circuit 14. In response to the control signal at output $12A_{O2}$, flyback control circuit 14 generates a drive signal to begin charging windings associated with primary side 15 of transformer 16, i.e., charging the primary windings.

In operation, synchronous rectification control module 12A controls pulse width modulation on primary side 15 of a quasi-resonant controller to achieve continuous current mode operation from a synchronous rectification controller associated with secondary side 17. More particularly, the portion of control module 12A associated with secondary side 17 monitors output voltage $V_{OUT}$ and a drive signal from rectifier driver circuit 20. In response to output voltage $V_{OUT}$ being greater than reference level $V_{REF}$ and a trigger signal initiated by synchronous rectifier controller 20 being at, for example, a logic high voltage level, the timer of control module 12A is started. If the trigger signal remains at the logic high voltage level for a time $t_d$ that exceeds a time limit $t_1$, control module 12A generates a drive signal that turns off rectifier 18, which rectifier 18 is associated with secondary side 17. By way of example, the amount of time or the duration of the on-time over which secondary synchronous synchronization occurs may be a predefined value, i.e., the on-time of the secondary synchronous controller may be a predefined limit value.

In addition, the portion of control module 12A associated with primary side 15 generates a control signal that is transmitted to flyback control circuit 14 turning on a transistor to simulate transformer demagnetization, and preferably complete transformer demagnetization, i.e., zero current detection, which enables charging of the windings associated with primary side 15, i.e., charging the primary windings. In accordance with an embodiment, the transistor shown in QR flyback control circuit 14 may be transistor 35 shown in FIG. 2.

Figure 2:
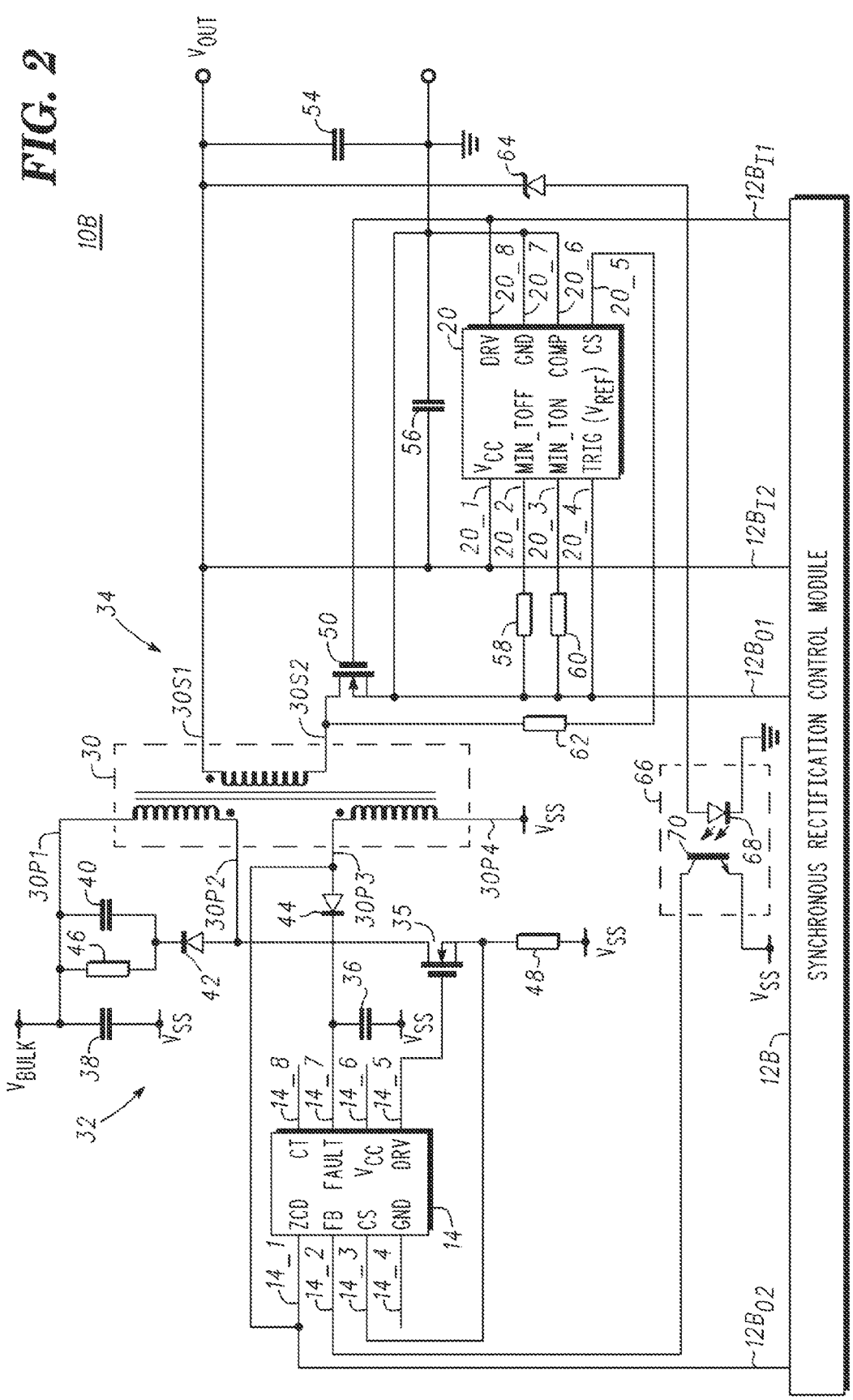
FIG. 2 is a circuit schematic of a power converter including a secondary synchronous rectification control module in accordance with another embodiment of the present invention.

FIG. 2 is a circuit schematic of power converter 10B in accordance with another embodiment of the present invention. Power converter 10B includes a transformer 30 having a primary side 32 and a secondary side 34. A field effect transistor 35, a flyback control circuit 14, energy storage elements 36, 38, and 40, diodes 42 and 44, impedance elements 46 and 48 are coupled to primary side 32 of transformer 30 and a field effect transistor 50, rectifier driver circuit 20, energy storage elements 54 and 56, impedance elements 58, 60, and 62, and a Zener diode 64 are coupled to secondary side 34 of transformer 30. Secondary side 34 is coupled to the primary side 30 through an optocoupler 66, which may be referred to as a coupling device. Optocoupler 66 may be comprised of a light emitting diode 68 that is optically coupled to a light activated device 70. In addition, secondary side 34 is coupled to primary side 32 through secondary synchronous rectification control module 12B. Secondary synchronous rectification control module 12B may be referred to as a synchronous rectification control module, a continuous current mode (CCM) quasi-resonant (QR) flyback controller, a control module, or a control circuit. It should be noted that the configuration of module 12B may be different from that of module 12A shown in FIG. 1. By way of example, energy storage elements 36, 38, 40, 54, and 56 are capacitors, impedance elements 46, 48, 58, 60, and 62 are resistors, and transistors 35 and 50 are Metal Oxide Semiconductor Field Effect Transistors (MOSFETS).

In accordance with an embodiment, transformer 30 has primary side terminals 30P1, 30P2, 30P3, and 30P4 and secondary side terminals 30S1 and 30S2. Capacitors 38 and 40 and resistor 46 each have a terminal connected to terminal 30P1 of transformer 30 and for receiving a potential $V_{bulk}$. Capacitor 38 has another terminal that is coupled for receiving a source of operating potential $V_{SS}$, which may be, for example, ground potential, wherein capacitor 38 serves as a decoupling capacitor. Capacitor 40 and resistor 46 also have terminals that are connected together and to the cathode of diode 42. The anode of diode 42 is connected to terminal 30P2 of transformer 30 and to a drain terminal of transistor 35. Transistor 35 has a gate terminal coupled for receiving a drive signal from an output terminal 14_5 of flyback control circuit 14 and a source terminal coupled to a terminal of resistor 48 and to an input terminal 14_3 of flyback control circuit 14. The other terminal of resistor 48 is coupled for receiving a source of operating potential such as, for example, a voltage $V_{SS}$. Thus, the source terminal of transistor 35 is coupled to, for example, operating potential $V_{SS}$ through resistor 48. By way of example, source of operating potential $V_{SS}$ is ground. Terminal 30P3 of transformer 30 is connected to an anode of diode 44 and to an input terminal 14_1 of flyback control circuit 14. The cathode of diode 44 is connected to an input terminal 14_7 of flyback control circuit 14. Flyback control circuit 14 may be a quasi-resonant current-mode controller such as, for example, an NCP1379 or an NCP1380 sold by ON Semiconductor. Capacitor 36 is coupled between input terminal 30P3 and, for example, source of operating potential $V_{SS}$ and serves as a decoupling capacitor. Terminal 30P4 of transformer 30 is coupled for receiving, for example, source operating potential $V_{SS}$.

Still referring to FIG. 2, rectifier driver circuit 20 may be a secondary side synchronous rectification driver such as, for example, an NCP4030A or an NCP4030B sold by ON Semiconductor. Driver circuit 20 may be referred to as a secondary side circuit. NCP4030A has an input terminal 20_1 for supplying a source of power to the driver circuit 20, input terminals 20_2 and 20_3 for adjusting the minimum off-time and minimum on-time timers of driver circuit 20, an input terminal 20_4 for resetting driver circuit 20, a current sense input terminal 20_5, a compensation input terminal 20_6, an input terminal 20_7 for connecting to a ground signal, and an output terminal 20_8 for driving a rectifier or the gate terminal of a transistor such as, for example, transistor 50. More particularly, input terminal 20_1 is connected to terminal 30S1 of transformer 30 and to input terminal $12B_{I2}$ of synchronous rectification control module 12B. It should be noted that input terminal 20_1 of driver circuit 20 and input terminal $12B_{I2}$ of control module 12B are coupled for receiving output signal $V_{OUT}$. By way of example, output signal $V_{OUT}$ is a voltage signal. Input terminals 20_2 and 20_3 are connected to terminals of resistors 58 and 60, respectively, and input terminal 20_4 is connected to the other terminals of resistors 58 and 60, to the source terminal of transistor 50, and to input terminals 20_6 and 20_7. Input terminals 20_6 and 20_7 are also connected to input terminal 20_1 through capacitor 56. The drain terminal of transistor 50 is connected to terminal 30S2 of transformer 30 and the gate terminal of transistor 50 is connected to output terminal 20_8 and to input terminal $12B_{I1}$. Input terminal 20_5 is connected to the drain terminal of transistor 50 through resistor 62.

Capacitor 54 is coupled between terminal 30S1 and, for example, ground and serves as a decoupling capacitor.

In operation, synchronous rectification control module 12B controls pulse width modulation on primary side 32 of a quasi-resonant controller to achieve continuous current mode operation from a synchronous rectification controller on secondary side 34 in response to the high power secondary synchronous on-time exceeding a predetermined or user specified time limit. More particularly, driver circuit 20 provides a drive signal to the gate of transistor 50 and to monitoring input $12B_{I1}$ of control module 12B that is associated with secondary side 34 of power transformer 30. In addition, control module 12B generates a trigger signal at output $12B_{O1}$ in response to the drive signal to the gate of transistor 50 remaining at a level greater than the voltage level of reference voltage $V_{REF}$ for a predetermined time $t_d$ that is greater than a limit time $t_1$. As discussed above, reference voltage $V_{REF}$ is generated by driver circuit 20, wherein the voltage at output $12B_{O1}$ is compared to reference voltage $V_{REF}$ to generate a trigger signal. In response to the trigger signal, drive signal driver circuit 20 generates drive signal DRV. It should be noted that time $t_d$ is a user selected parameter and may range from, for example, about 1 microsecond (µs) to about 20 µs. In response to output voltage $V_{OUT}$ being greater than about 50% of the nominal/regulated value and the secondary synchronous rectification on-time having a predetermined or user defined value, control module 12B generates a trigger signal that is transmitted to input terminal 20_3 of driver circuit 20. In accordance with embodiments in which driver circuit 20 is, for example a secondary synchronous driver 4303A, the trigger signal causes driver circuit 20 to generate a turn-off signal, e.g., a logic low voltage signal, at drive terminal 20_8 that turns off transistor or rectifier 50 after an internal processing delay that may be, for example, about 100 nanoseconds (ns).

In addition, control module 12B generates a control signal at output terminal $12B_{O2}$ that is transmitted to zero current detection input 14_1 of flyback control circuit 14. In response to the zero current detection signal at input terminal 14_1, i.e., after transistor 50 is turned off, flyback control circuit 14 generates a drive signal at output terminal 14_5 that turns on transistor 35 to begin charging windings associated with the primary side of transformer 30, i.e., charging the primary windings.

Thus, synchronous rectification control module 12B operates such that secondary side 34 serves as the master control or master controller of power converter 10B and primary side 32 serves as the slave controller or a slave to turn off rectifier 50 before transistor 35 is turned on to begin a charging phase. It should be noted that in response to the power consumption of converter 10B exceeding a user defined limit and causing the secondary synchronous on-time to increase, converter 10B is configured to enter a continuous conduction operating mode to inhibit a further decrease in the operating frequency. An advantage of inhibiting the decrease in operating frequency is that it precludes the use of large transformers to address primary side inductance saturation.

Figure 3:
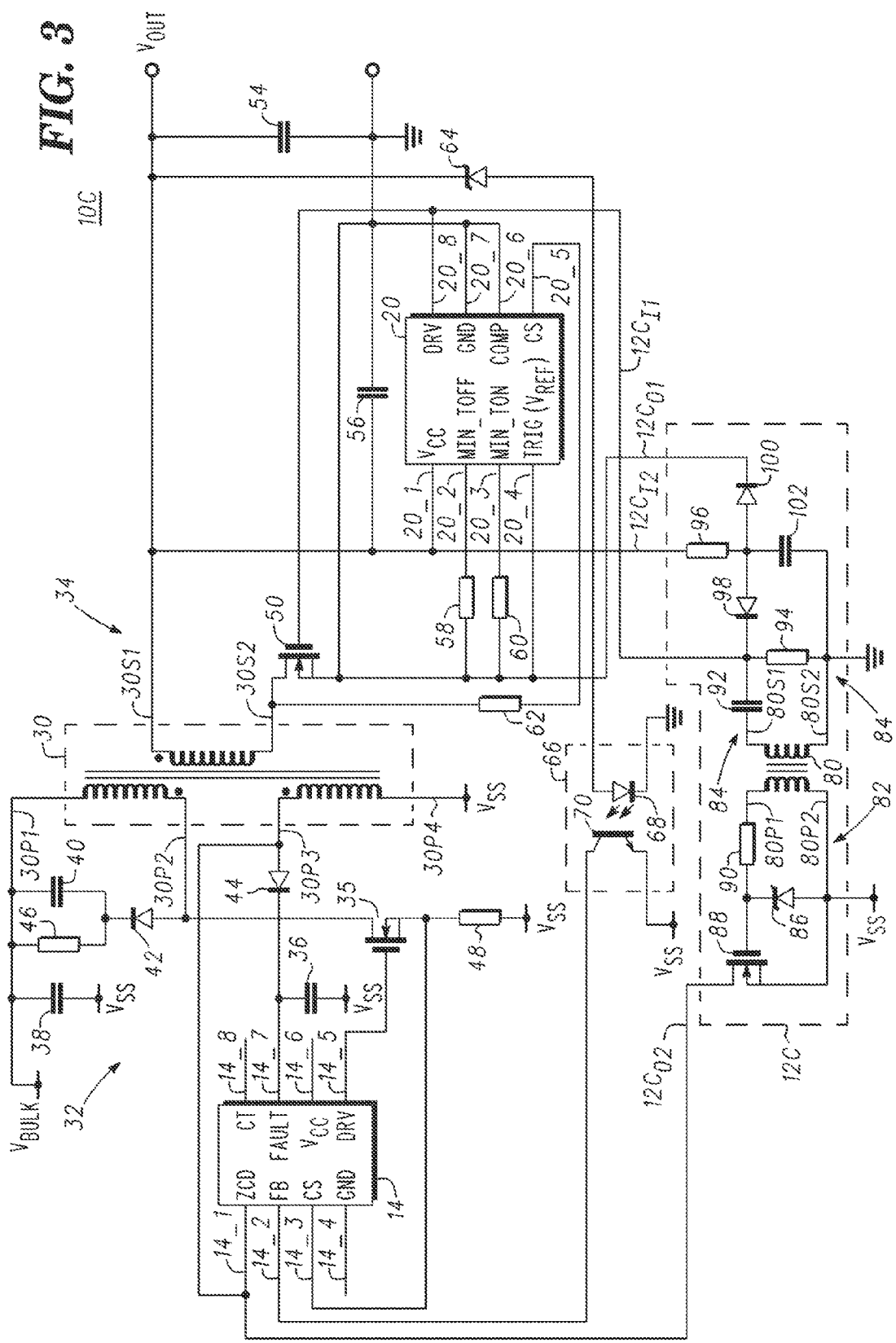
FIG. 3 is a circuit schematic of a power converter including a secondary synchronous rectification control module in accordance with another embodiment of the present invention.

FIG. 3 is a circuit schematic of power converter 10C in accordance with another embodiment of the present invention. Power converter 10C includes a rectifier driver circuit 20 connected to a synchronous rectification control module 12C. Secondary synchronous rectification control module 12C may be referred to as a synchronous rectification control module, a continuous current mode (CCM) quasi-resonant (QR) flyback controller, a control module, or a control circuit. Rectifier driver circuit 20 has been described with reference to FIG. 2. It should be noted that the configuration of module 12C may be different from those of modules 12A and 12B shown in FIGS. 1 and 2, respectively. Synchronous rectification control module 12C includes a pulse transformer 80 having a primary side 82 and a secondary side 84. Primary side 82 has terminals, also referred to as primary side terminals 80P1 and 80P2, and is connected to a Zener diode 86 and a transistor 88 through an impedance element 90. Transistor 88 may be an n-channel field effect transistor having a drain terminal that serves as an output terminal $12C_{O2}$ connected to input terminal 14_1 of flyback control circuit 14, a gate terminal connected to a cathode of Zener diode 86 and to a terminal of impedance element 90. Transistor 88 has a source terminal connected to the anode of Zener diode 86, to primary side terminal 80P2 of pulse transformer 80, and for receiving source of operating potential $V_{SS}$. Impedance element 90 has another terminal that is connected to primary side terminal 80P1 of pulse transformer 80.

Secondary side 84 has terminals 80S1 and 80S2, also referred to as secondary side terminals, where terminal 80S1 is connected to a terminal of impedance element 94 through energy storage element 92 and terminal 80S2 is connected to the other terminal of impedance element 94. More particularly, capacitor 92 has a terminal connected to secondary side terminal 80S1 of pulse transformer 80 and a terminal commonly connected to a terminal of impedance element 94, to a cathode of diode 98 to form a monitoring input terminal $12C_{I1}$ that is connected to output terminal 20_8 of driver circuit 20. The anode of diode 98 is commonly connected to the anode of diode 100, a terminal of impedance element 96, and a terminal of energy storage element 102. The other terminal of impedance element 96 serves as an input terminal $12C_{I2}$ and is connected to input terminal 20_1 of driver circuit 20.

Impedance element 94 and energy storage element 102 have terminals commonly connected to secondary side terminal 80S2 of pulse transformer 80 and to, for example, ground. By way of example, impedance elements 90, 94, and 96 are resistors and energy storage elements 92 and 102 are capacitors.

In operation, synchronous rectification control module 12C controls pulse width modulation on primary side 32 of a quasi-resonant controller to achieve continuous current mode operation from synchronous rectification controller 12C on secondary side 34. More particularly, driver circuit 20 provides a drive signal DRV to the gate of transistor 50 and to a monitoring input $12C_{f1}$ of control module 12C that is associated with secondary side 34 of power transformer 30. In addition, control module 12C generates a trigger signal at an output terminal $12C_{O1}$ if voltage DRV remains at a logic high level for a sufficient time $t_d$ to charge capacitor 102 to a voltage greater than reference voltage $V_{REF}$. It should be noted that time $t_d$ is a user selected parameter that may be selected in accordance with a product of the resistance and capacitance values of resistor 96 and capacitor 102 and may range from, for example, about 1 µs to about 20 µs. In response to the secondary synchronous on-time being greater than time $t_d$ or the voltage of capacitor 102 being greater than reference voltage level $V_{REF}$, control module 12C generates a signal at the cathode of diode 100, i.e., at output $12C_{O1}$, that serves as a trigger signal, which is transmitted to input terminal 20_4 of driver circuit 20. In accordance with embodiments in which driver circuit 20 is, for example a secondary synchronous driver 4303A, the trigger signal causes driver circuit 20 to generate a turn-off signal, e.g., a logic low voltage signal, at drive terminal 20_8 that turns off transistor or rectifier 50 after a delay, i.e., a timer voltage such as, for example, the voltage on capacitor 92, of power converter 10C is compared with a reference voltage $V_{REF}$ and in response to the timer voltage being greater than the reference voltage for predetermined period of time $t_d$, a control signal is generated that turns off transistor 50.

More particularly, in response to drive signal DRV being at about ground level, transistor 50 is off or non-conducting and the cathode of diode 100 is at a voltage level substantially equal to ground because it is connected to input 20_7. In this configuration, capacitor 102 is in parallel with diode 100, and is discharged to a voltage substantially equal to forward voltage drop across diode 100, e.g., about 0.3 volts to about 0.8 volts. In response to drive signal DRV being at a level sufficient to turn transistor 50 on, diode 98 serves as a blocking diode and timing capacitor 102 becomes charged, i.e., the voltage on timing capacitor 102 increases. In response to the voltage on timing capacitor 102 being greater than the trigger level through diode 100, the trigger signal is activated, switching off transistor 50. As discussed above, reference voltage $V_{REF}$ is generated by driver circuit 20, wherein the voltage at output $12C_{O1}$ from timing capacitor 102 is compared to reference voltage $V_{REF}$ to generate the trigger signal, which causes driver circuit 20 to generate drive signal DRV. In response to drive signal DRV on resistor 94 transitioning from a high voltage level to a low voltage level, timing capacitor 102 becomes discharged and a negative pulse is transmitted through capacitor 92 and applied to transformer 80. The negative pulse is transferred to the primary side of transformer 80 as a positive pulse at terminal 80P1.

The positive pulse at terminal 80P1 turns on transistor 88, which places a voltage of substantially zero volts at terminal 14_1, i.e., control module 12C generates a control signal that is transmitted to zero current detection input 14_1 of flyback control circuit 14 through output $12C_{O2}$. In response to the zero current detection signal at input terminal 14_1, flyback control circuit 14 generates a drive signal at output terminal 14_5 that turns on transistor 35, to begin charging the windings associated with the primary side of transformer 30, i.e., charging the primary windings. After charging the primary windings, transistor 35 switches off and transistor 50 turns on, beginning a new cycle. It should be noted that the on-time of transistor 88 may be limited so that it turns off in response to transistor 35 turning on. The on-time of transistor 88 may be controlled by the capacitance value of capacitor 92.

Thus, synchronous rectification control module 12 operates such that secondary side 34 serves as the master control of power converter 10C and primary side 32 serves as the slave controller or a slave to turn off rectifier 50 before transistor 35 is turned on to begin a charging phase.

Figure 4:
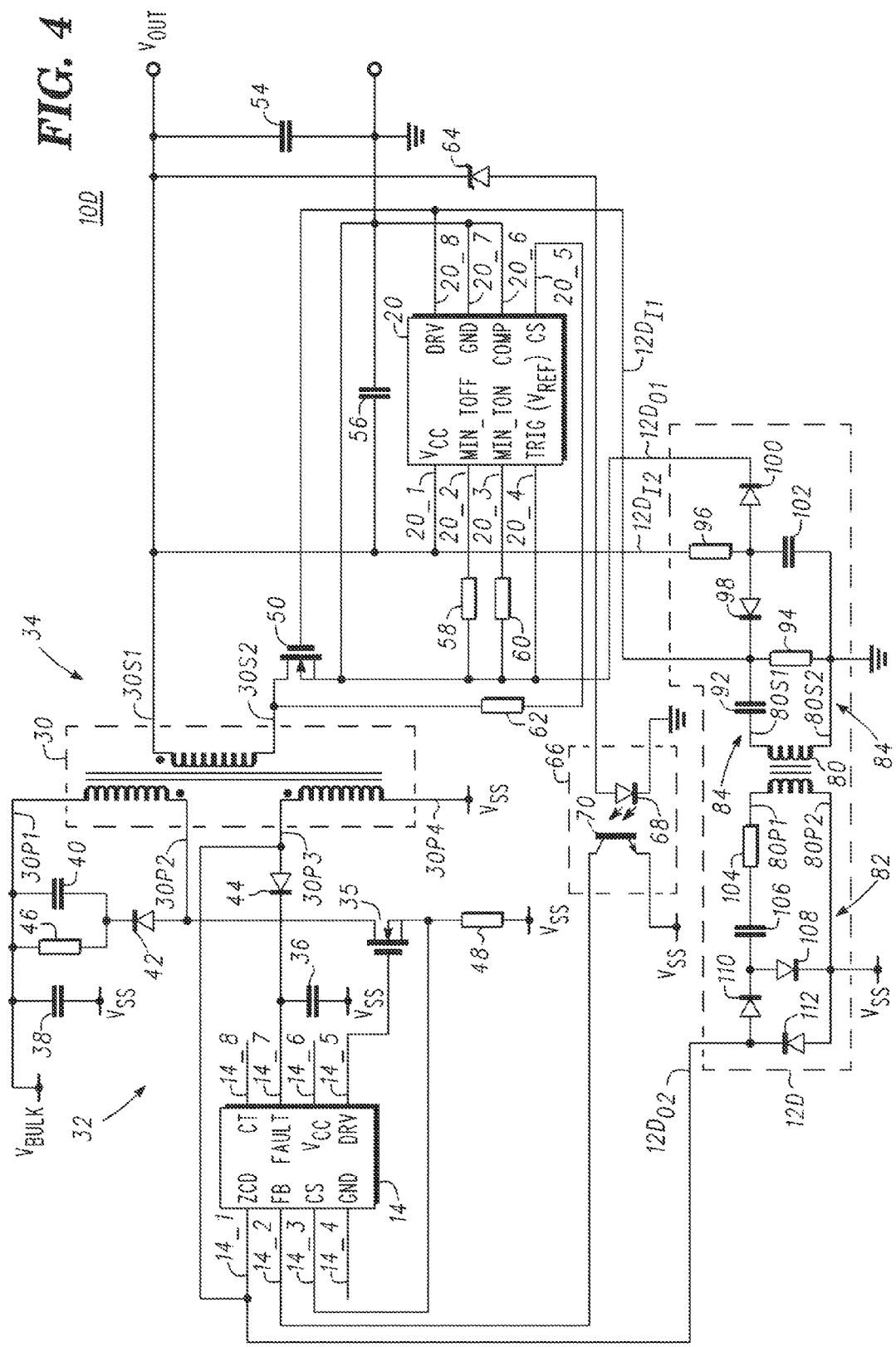
FIG. 4 is a circuit schematic of a power converter including a secondary synchronous rectification control module in accordance with another embodiment of the present invention.

FIG. 4 is a circuit schematic of power converter 10D in accordance with another embodiment of the present invention. Power converter 10D includes a rectifier driver circuit 20 connected to a secondary synchronous rectification control module 12D. Secondary synchronous rectification control module 12D may be referred to as a synchronous rectification control module, a continuous current mode (CCM) quasi-resonant (QR) flyback controller, a control module, or a control circuit. Rectifier driver circuit 20 has been described with reference to FIG. 2. It should be noted that the configuration of module 12D may be different from those of modules 12A, 12B, and 12C shown in FIGS. 1, 2, and 3, respectively. Synchronous rectification control module 12D includes pulse transformer 80 having primary side 82 and secondary side 84. The circuit elements and configurations of the circuit elements connected to secondary side 84 have been described with reference to FIG. 3.

An impedance element 104 has a terminal connected to primary side terminal 80P1 of pulse transformer 80 and a terminal connected to a terminal of an energy storage element 106. Energy storage element 106 has another terminal that is commonly connected to the anode of diode 108 and to a cathode of a diode 110. The anode of diode 110 is connected to a cathode of diode 112 to form an output terminal $12D_{O2}$, which is connected to input terminal 14_1 of flyback control circuit 14. The anode of diode 112, the cathode of diode 108, and primary side terminal 80P2 of pulse transformer 80 are commonly connected together and for receiving a source of operating potential such as, for example, operating potential $V_{SS}$. By way of example, impedance element 104 is a resistor and energy storage element 106 is a capacitor.

In operation, synchronous rectification control module 12D controls pulse width modulation on primary side 32 of a quasi-resonant controller to achieve continuous current mode operation from a synchronous rectification controller 12D on secondary side 34. More particularly, driver circuit 20 provides a drive signal to the gate of transistor 50 and to a monitoring input $12D_{f1}$ of control module 12D that is associated with secondary side 34 of power transformer 30. In addition, control module 12D generates a trigger signal at an output terminal $12D_{O1}$ if voltage DRV remains at a logic high level for a sufficient time $t_d$ to charge capacitor 102 to a voltage greater than reference voltage $V_{REF}$. It should be noted that time $t_d$ is a user selected parameter that may be selected in accordance with a product of the resistance and capacitance values of resistor 96 and capacitor 102 and may range from, for example, about 1 µs to about 20 µs. In response to the secondary synchronous on-time being greater than user defined time $t_d$ or the voltage of capacitor 102 being greater than reference voltage level $V_{REF}$, control module 12D generates a signal at the cathode of diode 100, i.e., at output $12D_{O1}$, that serves as a trigger signal, which is transmitted to input terminal 20_4 of driver circuit 20. In accordance with embodiments in which driver circuit 20 is, for example, a secondary synchronous driver 4303A, the trigger signal causes driver circuit 20 to generate a turn-off signal, e.g., a logic low voltage signal, at drive terminal 20_8 that turns off transistor or rectifier 50 after a delay, i.e., a timer voltage such as, for example, the voltage on capacitor 92, of power converter 10D is compared with a reference voltage $V_{REF}$ and in response to the timer voltage being greater than the reference voltage for predetermined period of time $t_d$, a control signal is generated that turns off transistor 50.

More particularly, in response to drive signal DRV being at about ground level, transistor 50 is off or non-conducting and the cathode of diode 100 is at a voltage level substantially equal to ground because it is connected to input 20_7. In this configuration, capacitor 102 is in parallel with diode 100, and is discharged to a voltage substantially equal to forward voltage drop across diode 100, e.g., about 0.3 volts to about 0.8 volts. In response to drive signal DRV being at a level sufficient to turn transistor 50 on, diode 98 serves as a blocking diode and timing capacitor 102 becomes charged, i.e., the voltage on timing capacitor 102 increases. In response to the voltage on timing capacitor 102 being greater than the trigger level through diode 100, the trigger signal is activated, switching off transistor 50. As discussed above, reference voltage $V_{REF}$ is generated by driver circuit 20, wherein the voltage at output 12DO1 from timing capacitor 102 is compared to reference voltage $V_{REF}$ to generate the trigger signal, which causes driver circuit 20 to generate drive signal DRV. In response to drive signal DRV on resistor 94 transitioning from a high voltage level to a low voltage level, timing capacitor 102 becomes discharged and a negative pulse is transmitted through capacitor 92 and applied to transformer 80. The negative pulse is transferred to the primary side of transformer 80 as a negative pulse at terminal 80P1.

The negative pulse at terminal 80P1 is transmitted to the diode network comprising diodes 108, 110, and 112, through capacitor 106. This causes the voltage at terminal 14_1 to be substantially zero volts, i.e., control module 12 generates a control signal at output $12D_{O2}$ that is transmitted to zero current detection input 14_1 of flyback control circuit 14. In response to the zero current detection signal at input terminal 14_1, flyback control circuit 14 generates a drive signal at output terminal 14_5 that turns on transistor 35, to begin charging the windings associated with the primary side 32 of transformer 30, i.e., charging the primary windings. After charging the primary windings, transistor 35 switches off and transistor 50 turns on beginning a new cycle. It should be noted that the time at which a low voltage appears at terminal 14_1 may be limited so that it turns off in response to transistor 35. This time may be controlled by capacitor 92.

Figure 5:
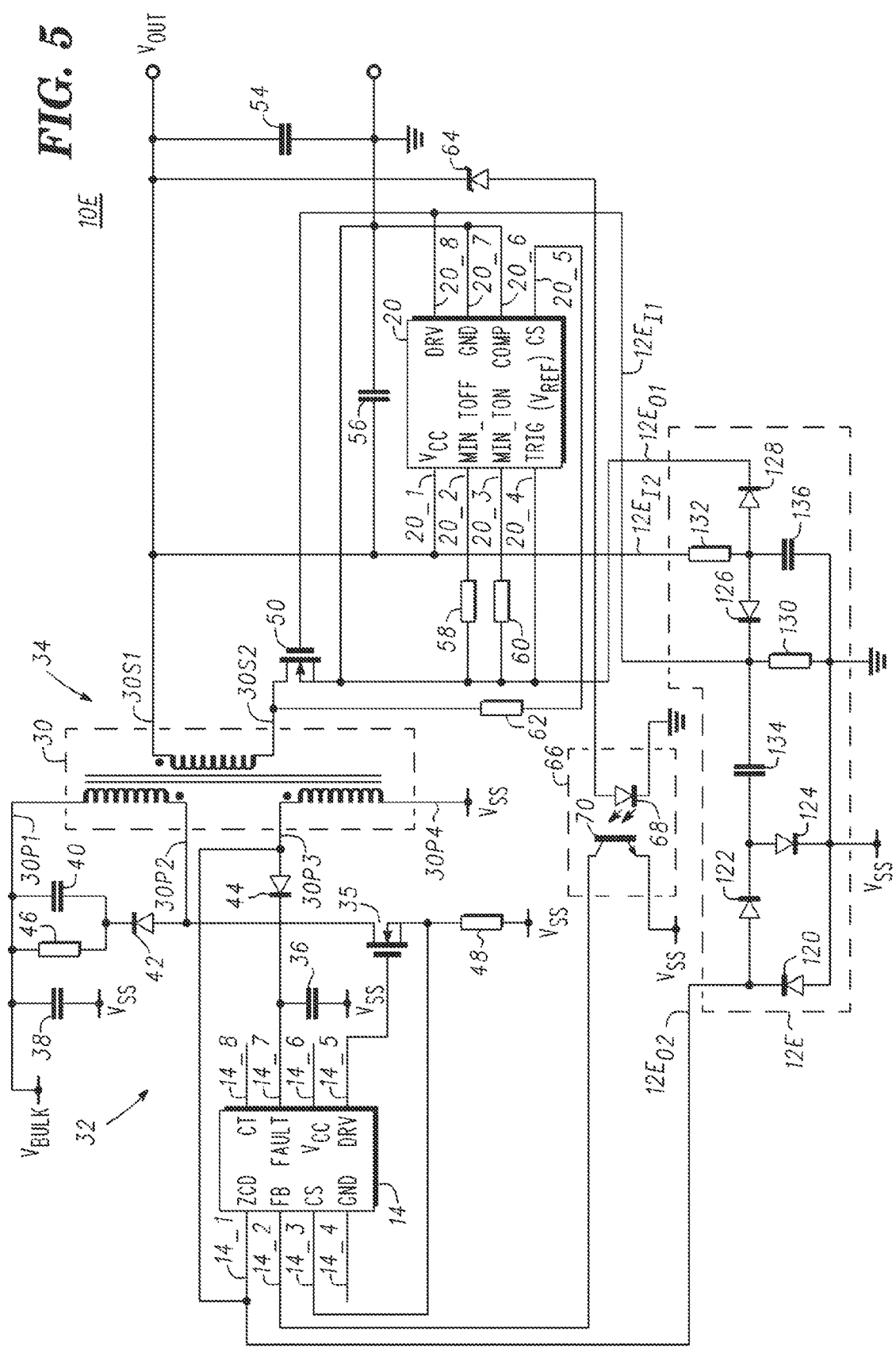
FIG. 5 is a circuit schematic of a power converter including a secondary synchronous rectification control module in accordance with another embodiment of the present invention.

FIG. 5 is a circuit schematic of power converter 10E including a module 12E in accordance with another embodiment of the present invention. It should be noted that the configuration of module 12E may be different from those of modules 12A, 12B, 12,C, and 12D shown in FIGS. 1, 2, 3, and 4, respectively. Secondary synchronous rectification control module 12E may be referred to as a synchronous rectification control module, a continuous current mode (CCM) quasi-resonant (QR) flyback controller, a control module, or a control circuit. Module 12E includes diodes 120, 122, 124, 126, and 128, impedance elements 130 and 132, and energy storage elements 134 and 136. It should be noted that the configuration of module 12E may be different from those of modules 12A and 12B shown in FIGS. 1 and 2, respectively. More particularly, diode 120 has a cathode connected to an anode of diode 122 to form an output $12E_{O2}$ that is connected to input terminal 14_1 of flyback control circuit 14. Diode 124 has an anode commonly connected to the cathode of diode 122 and to a terminal of energy storage element 134. Energy storage element 134 has another terminal that is commonly connected to a terminal of impedance element 130 and to a cathode of diode 126 to form an input $12E_{I1}$, which input is connected to output terminal 20_8 of driver circuit 20. Diode 126 has an anode commonly connected to the anode of diode 128, to a terminal of impedance element 132, and to a terminal of energy storage element 136. The other terminal of impedance element 132 serves as an input $12E_{I2}$ and is connected to input terminal 20_1 of driver circuit 20 and for receiving output voltage $V_{OUT}$. The cathode of diode 128 serves as an output $12E_{O1}$, which output is connected to the source terminal of transistor 50. The anode of diode 120, the cathode of diode 124, and the other terminals of impedance element 130 and energy storage element 136 are coupled for receiving a source of operating potential such as, for example, operating potential $V_{SS}$. By way of example, impedances elements 130 and 132 are resistors and energy storage elements 134 and 136 are capacitors.

In operation, synchronous rectification control module 12E controls pulse width modulation on primary side 32 of a quasi-resonant controller to achieve continuous current mode operation from a synchronous rectification controller on secondary side 34. More particularly, driver circuit 20 provides a drive signal to the gate of transistor 50 and to monitoring input $12E_{I1}$ of control module 12E that is associated with secondary side 34 of power transformer 30. In addition, control module 12E generates a trigger signal at an output terminal $12E_{O1}$ if voltage DRV remains at a logic voltage high level for a sufficient time $t_d$ to charge capacitor 136 to a voltage greater than reference voltage $V_{REF}$. It should be noted that time $t_d$ is a user selected parameter that may be selected in accordance with a product of the resistance and capacitance values of resistor 132 and capacitor 136 and may range from, for example, about 1 µs to about 20 µs. In response to the secondary synchronous on-time being greater than user defined time $t_d$ or the voltage of capacitor 136 being greater than reference voltage level $V_{REF}$, control module 12E generates a signal at the cathode of diode 128, i.e., at output $12E_{O1}$, that serves as a trigger signal, which is transmitted to input terminal 20_4 of driver circuit 20. In accordance with embodiments in which driver circuit 20 is, for example, a secondary synchronous driver 4303A, the trigger signal causes driver circuit 20 to generate a turn-off signal, e.g., a logic low voltage signal, at drive terminal 20_8 that turns off transistor or rectifier 50 after a delay, i.e., a timer voltage such as, for example, the voltage on capacitor 136 of power converter 10E is compared with a reference voltage $V_{REF}$ and in response to the timer voltage being greater than the reference voltage for predetermined period of time $t_d$ a control signal is generated that turns off transistor 50.

In addition, control module 12E generates a control signal at output $12E_{O2}$ that is transmitted to zero current detection input 14_1 of flyback control circuit 14. The control signal is transmitted through capacitor 134 similar to the control signal transferred through capacitor 92 as described with reference to FIG. 4. In response to the zero current detection signal at input terminal 14_1, flyback control circuit 14 generates a drive signal at output terminal 14_5 that turns on transistor 35 to begin charging the windings associated with primary side 32 of transformer 30, i.e., charging the primary windings.

Figure 6:
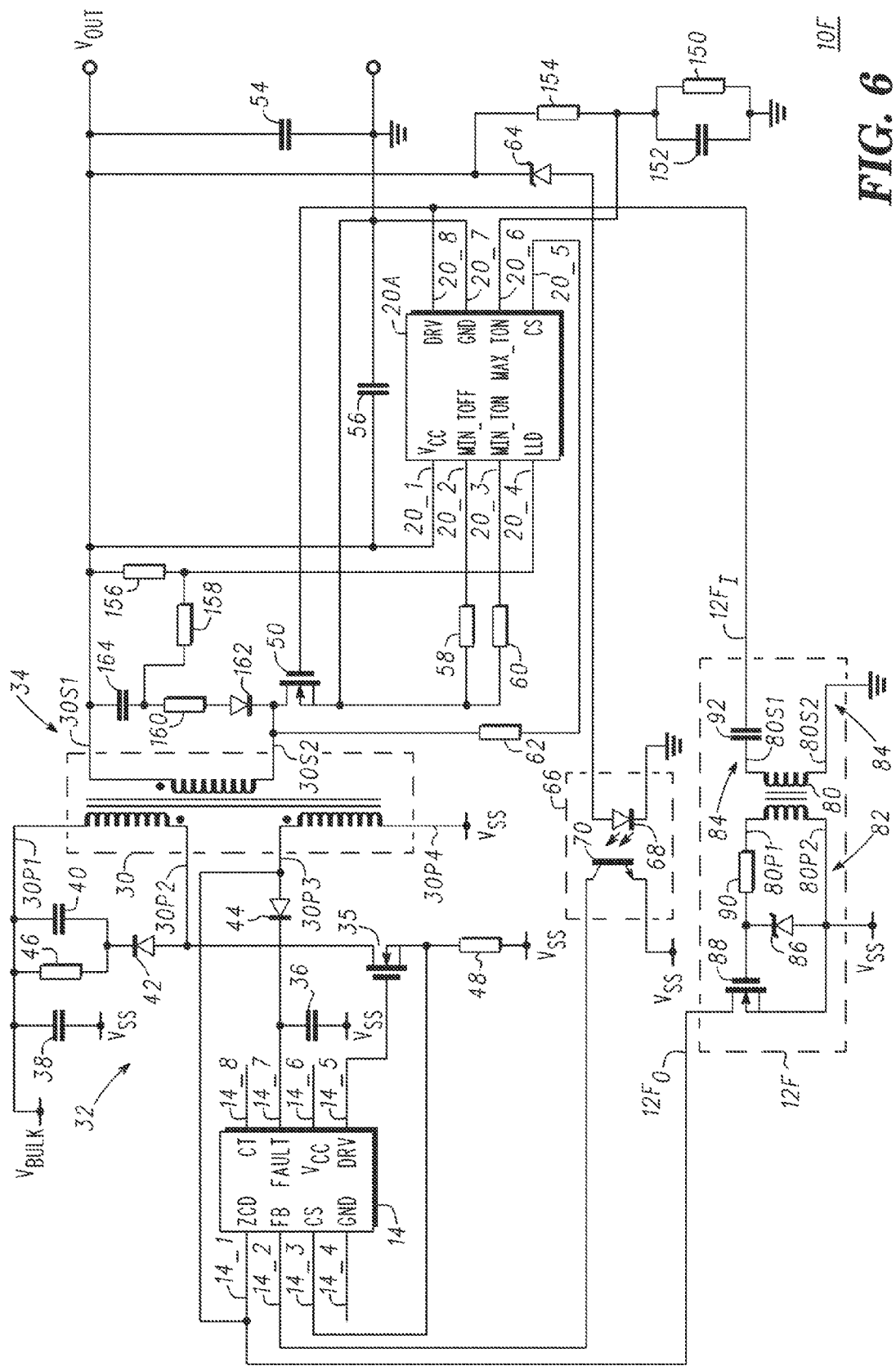
FIG. 6 is a circuit schematic of a power converter including a secondary synchronous rectification control module in accordance with another embodiment of the present invention.

FIG. 6 is a circuit schematic of power converter 10F in accordance with another embodiment of the present invention. Power converter 10F includes a rectifier driver circuit 20A connected to a synchronous rectification control module 12F. Rectifier driver circuit 20A of FIG. 6 is similar to rectifier driver circuit 20 of FIGS. 2-5 except that input terminal 20_6 is coupled for adjusting a maximum on-time of transistor 50 and terminal 20_4 is coupled for modulating the driver clamp level and turning off the driver during light load conditions. For example, input terminal 20_6 may be connected to ground through a parallel combination of a resistor 150 and a capacitor 152 and to a cathode of Zener diode 64 through a resistor 154. Input terminal 20_4 may be connected to terminal 30S1 through a resistor 156 and to a drain of transistor 50 through a resistor 158 and a series connected resistor 160 and diode 162. Resistor 158 may be connected to terminal 30S1 through a capacitor 164.

Primary side 82 has terminals 80P1 and 80P2 and is connected to a Zener diode 86 and a transistor 88 through an impedance element 90. Zener diode 86 may be referred to as a regulation element. Transistor 88 may be an n-channel field effect transistor having a drain terminal that serves as an output terminal $12F_O$ connected to input terminal 14_1 of flyback control circuit 14, a gate terminal connected to a cathode of Zener diode 86 and to a terminal of impedance element 90. Transistor 88 has a source terminal connected to the anode of Zener diode 86, to primary terminal 80P2 of pulse transformer 80, and for receiving source of operating potential $V_{SS}$. Impedance element 90 has another terminal that is connected to primary side terminal 80P1 of pulse transformer 80.

Secondary side 84 has terminals 80S1 and 80S2, where terminal 80S1 is connected to drive terminal 20_8 through energy storage element 92 and terminal 80S2 is coupled for receiving a source of operating potential such as, for example, ground. More particularly, capacitor 92 has a terminal connected to secondary side terminal 80S1 of pulse transformer 80 and a terminal connected to output terminal 20_8 of driver circuit 20, which serves as an input terminal $12F_I$. By way of example, energy storage element 92 is a capacitor.

In operation, synchronous rectification control module 12F controls pulse width modulation on primary side 32 of a quasi-resonant controller to achieve continuous current mode operation from a synchronous rectification controller 12F on secondary side 34. More particularly, driver circuit 20A provides a drive signal DRV to the gate of transistor 50 and to input $12F_I$ of control module 12F that is associated with secondary side 34 of power transformer 30. The values of resistors 150 and 154 and capacitor 152 are selected to set a maximum on-time for transistor 50. Thus, they are selected to cause driver circuit 20A to generate a turn-off signal, e.g., a logic low voltage signal, at drive terminal 20_8 that turns off transistor or rectifier 50.

Thus, synchronous rectification control module 12F operates such that secondary side 34 serves as the master control or controller of power converter 10F and primary side 32 serves as the slave controller or a slave to turn off rectifier 50 before transistor 35 is turned on to begin a charging phase.

Figure 7:
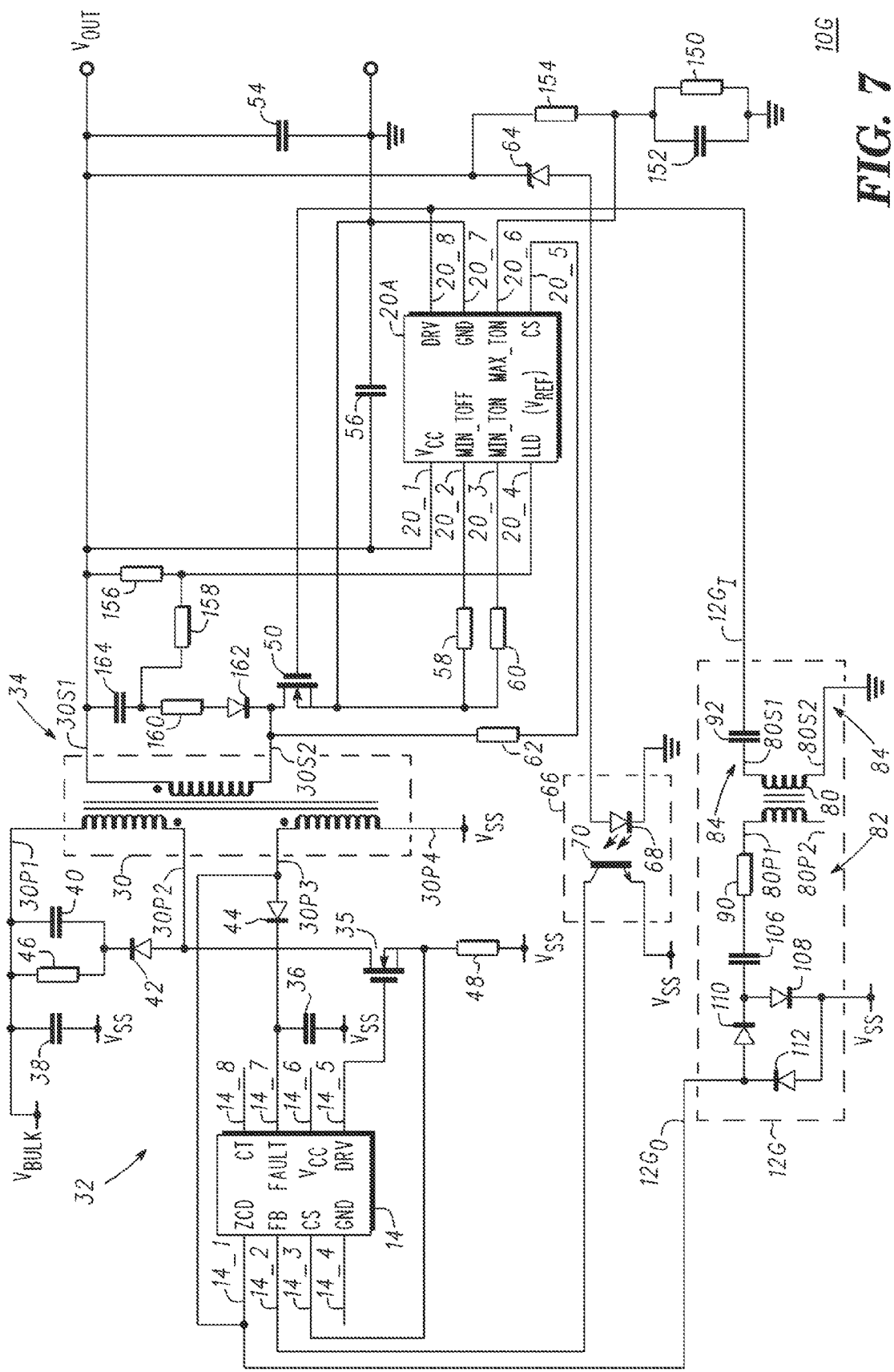
FIG. 7 is a circuit schematic of a power converter including a secondary synchronous rectification control module in accordance with another embodiment of the present invention.

FIG. 7 is a circuit schematic of power converter 10G in accordance with another embodiment of the present invention. The configuration on the secondary side of power converter 10G is similar to that of power converter 10F described above. Power converter 10G includes rectification control module 12G that has an input terminal $12G_I$ connected to terminal 20_8 and an output terminal $12G_O$ connected to ZCD input 14_1. Rectification control module 12G includes a transformer 80 having a primary side 82 and a secondary side 84, where the circuitry connected to the primary side has been described with reference to FIG. 4 and the circuitry connected to the secondary side has been described with reference to FIG. 6. Rectification control module 12G may be referred to as a synchronous rectification control module, a continuous current mode (CCM) quasi-resonant (QR) flyback controller, a control module, or a control circuit.

The operation of power converter 10G is similar to that described with reference to power converter 10F.

By now it should be appreciated that a circuit and a method for controlling the circuit have been provided that includes controlling pulse width modulation on a primary side of a quasi-resonant controller to achieve continuous current mode operation from a synchronous rectification controller on a secondary side. Thus, continuous conduction mode operation is achieved using a synchronous rectification controller on the secondary side of a transformer to control pulse width modulation of a quasi-resonant controller on the primary side of the transformer.

It should be noted that in an alternative embodiment, circuitry suitable for generating an on-time for transistor 50 may be monolithically integrated with driver circuit 20 or 20A. For example, the maximum on-time that transistor 50 is on may can be determined in response to output voltage $V_{OUT}$. An advantage of monolithically integrating the maximum on-time is that a QR controller can operate in CCM mode in response to a high load and ensures that transistor 50 switches off before the current flowing through it goes to zero or changes sign.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:
1. A circuit, comprising:
a first transformer having a primary side terminal and a secondary side terminal;
a primary side control circuit having a first input terminal, the primary side control circuit coupled to the primary side terminal of the first transformer;
a secondary side circuit having a first input terminal, a second input terminal, a first output terminal, and a second output terminal, the secondary side circuit coupled to the secondary side terminal of the first transformer; and
a control circuit having first and second input terminals and first and second output terminals, the first input terminal of the control circuit coupled to the first output terminal of the secondary side circuit, the second input terminal of the control circuit coupled to the second output terminal of the secondary side circuit, the first output terminal of the control circuit coupled to the first input terminal of the primary side control circuit, and the second output terminal of the control circuit coupled to the second output terminal of the secondary side circuit, the control circuit comprising:
a second transformer having first and second primary side terminals and first and second secondary side terminals;
a first circuit coupled to the primary side terminals; and
a second circuit coupled to the secondary side terminals, wherein the second circuit comprises:
a first energy storage element having first and second terminals, the first terminal coupled to the first secondary side terminal of the second transformer;
a first impedance element having first and second terminals, the first terminal coupled to the first energy storage element and the second terminal coupled to the second secondary side terminal of the second transformer;

a first diode having an anode and a cathode, the cathode coupled to the first energy storage element and the first impedance element; and a second diode having an anode and a cathode, the anodes of the first and second diodes coupled together.

2. The circuit of claim 1, wherein the second circuit further comprises:

a second energy storage element having first and second terminals, the first terminal coupled to the anodes of the first and second diodes; and a second impedance element having first and second terminals, the first terminal coupled to the second output of the secondary side circuit and the second terminal coupled to the anodes of the first and second diodes and to the first terminal of the second energy storage element.

3. The circuit of claim 1, wherein the first circuit comprises:

a second impedance element having first and second terminals, the first terminal of the second impedance element coupled to the first primary side terminal of the second transformer;

a second energy storage element having first and second terminals, the second terminal of the second energy storage element coupled to the second terminal of the second impedance element;

a third diode having an anode and a cathode, the anode of the third diode coupled to the first terminal of the second energy storage element;

a fourth diode having an anode and a cathode, the cathode of the fourth diode coupled to the anode of the third diode; and a fifth diode having an anode and a cathode, the cathode of the fifth diode coupled to the anode of the fourth diode.

4. The circuit of claim 1, wherein the first circuit comprises:

a second impedance element having first and second terminals, the first terminal coupled to the first primary side terminal;

a regulation element having first and second terminals, the first terminal coupled to the second terminal of the second impedance element; and a transistor having a control electrode and first and second current carrying electrodes, the control electrode coupled to the second impedance element and the regulation element.

5. The circuit of claim 4, wherein the second primary side terminal of the second transformer and the second terminal of the regulation element are coupled to the second current carrying electrode of the transistor.

6. A circuit, comprising:

a first transformer having a primary side terminal and a secondary side terminal;

a primary side control circuit having a first input terminal, the primary side control circuit coupled to the primary side terminal of the first transformer;

a secondary side circuit having a first input terminal, a second input terminal, a first output terminal, and a second output terminal, the secondary side circuit coupled to the secondary side terminal of the first transformer; and a control circuit having first and second input terminals and first and second output terminals, the first input terminal of the control circuit coupled to the first output terminal of the secondary side circuit and the first output terminal of the control circuit coupled to the first input terminal of the primary side control circuit, wherein the second input terminal of the control circuit is coupled to the second output terminal of the secondary side circuit and the second output terminal of the control circuit is coupled to the second output terminal of the secondary side circuit, and wherein the control circuit comprises:

a first energy storage element having first and second terminals;

a first impedance element having first and second terminals, the first terminal of the first impedance element coupled to the first terminal of the first energy storage element;

a first diode having an anode and a cathode, the cathode coupled to the first energy storage element and the first impedance element;

a second diode having an anode and a cathode, the anodes of the first and second diodes coupled together;

a second energy storage element having first and second terminals, the first terminal coupled to the anodes of the first and second diodes; and a second impedance element having first and second terminals, the first terminal coupled to the second output of the secondary side circuit and the second terminal coupled to the anodes of the first and second diodes and to the first terminal of the second energy storage element.

7. The circuit of claim 6, wherein the control circuit comprises:

a third diode having an anode and a cathode, the anode coupled to the second terminal of the first energy storage element;

a fourth diode having and anode and a cathode, the cathode of the fourth diode coupled to the anode of the third diode; and a fifth diode having an anode and a cathode, the cathode coupled to the anode of the fourth diode and the anode of the fifth diode coupled to the cathode of the third diode.

8. The circuit of claim 6, wherein the control circuit comprises:

a third impedance element having first and second terminals, the first terminal coupled to the first primary side terminal;

a regulation element having first and second terminals, the first terminal coupled to the second terminal of the third impedance element; and a transistor having a control electrode and first and second current carrying electrodes, the control electrode coupled to the third impedance element and the regulation element.

9. The circuit of claim 6, wherein the control circuit comprises:

a third impedance element having first and second terminals, the first terminal of the third impedance element coupled to a first primary side terminal of a second transformer;

a third energy storage element having first and second terminals, the second terminal of third energy storage element coupled to the second terminal of the third impedance element;

a third diode having an anode and a cathode, the anode of the third diode coupled to the first terminal of the third energy storage element;

a fourth diode having an anode and a cathode, the cathode of the fourth diode coupled to the anode of the third diode; and a fifth diode having an anode and a cathode, the cathode of the fifth diode coupled to the anode of the fourth diode.

10. The circuit of claim 6, further including a coupling device coupled between the primary side control circuit and the secondary side circuit.

11. The circuit of claim 10, wherein the coupling device is an optocoupler.

* * * * *